Feb. 18, 1941.   J. SVOBODA   2,232,348
METHOD OF AND APPARATUS FOR THE MANUFACTURE OF EXTENSIBLE
BANDS OR RIBBONS OF STAPLE FIBER
Filed July 11, 1939
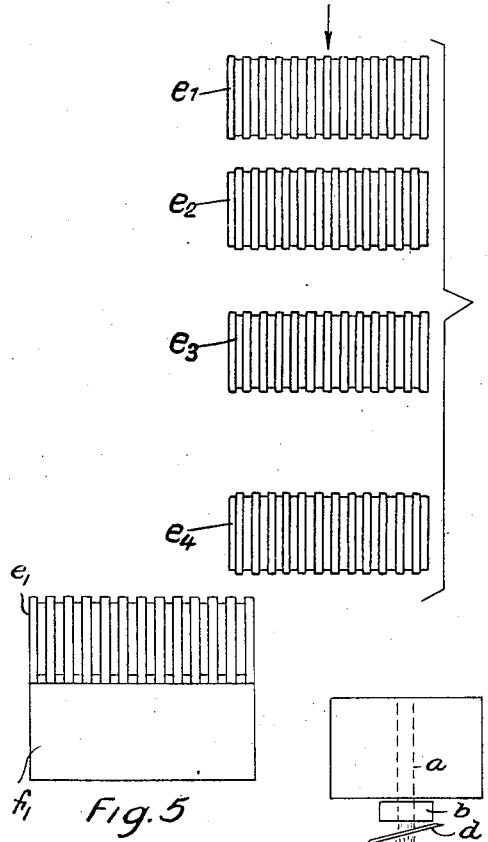
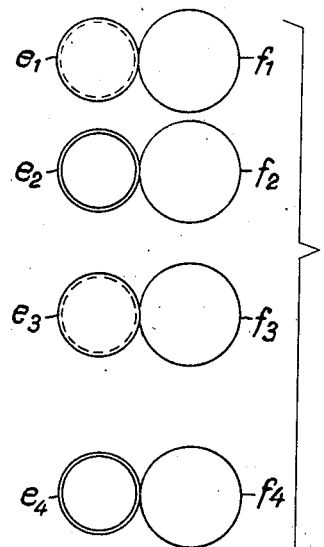
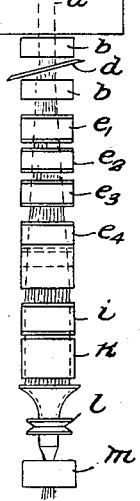
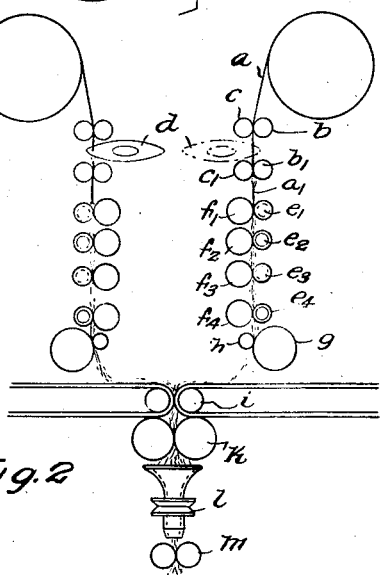
Inventor:
J. Svoboda
by: Glascock Downing & Seebold
Attys Patented Feb. 18, 1941

2,232,348

UNITED STATES PATENT OFFICE 2,232,348

METHOD OF AND APPARATUS FOR THE MANUFACTURE OF EXTENSIBLE BANDS OR RIBBONS OF STAPLE FIBER

Johannes Svoboda, Leisnig, Germany, assignor to the firm F. Bernhardt, Leisnig, Germany Application July 11, 1939, Serial No. 283,912
In Germany June 14, 1938

3 Claims. (Cl. 19—1)

The invention relates to a method of manufacturing extensible staple fiber bands or ribbons and an apparatus for carrying this method into practice.

Heretofore in the preparation of artificial fibers one was instructed to cut the fibers into staple length and to collect the cut off pieces in baskets. Here the cut off pieces of fiber became mixed together, the parallel position of the fibers which they had before cutting was destroyed and it was necessary to restore this position on the machines usually employed in cotton or wool spinning, such as openers, carding machines and the like, at the same time forming a sliver.

Considerable defects also exist in the known apparatus for making an extensible fiber band or ribbon, wherein a further treatment of the cut pieces of staple fibers follows on the cutting. Here a satisfactory result cannot be obtained, since the cut pieces of staple fiber, as soon as they have been released from the knife, are deposited on a conveyor band in a plurality of layers, in order to distribute in different ways the ends of the cut pieces of staple fiber. The individual fibers in a staple section adhere to one another laterally in such a manner that one should consider such a section as a broad whole or a plurality of large bundles of fibers. Even drawing rollers such as are often employed, or rubbing rollers do not operate successfully when employed for this purpose.

According to the invention all these defects are obviated in a very simple manner in that an extensible fiber band or ribbon is made from endless artificial fibers, for which purpose after cutting the artificial fibers (staple fibers) and subsequently dividing up into individual fibers, the fibers are combined into a band or ribbon. An essential advantage in this method is also the shortening of the procedure heretofore usual.

As shown in Figures 1 and 2 of the accompanying drawing the hank or skein of artificial fiber is continuously introduced into the apparatus from the preceding roll, lap or rollers by means of a pair of feeding in rollers, whereupon a rotary disc knife cuts the material alternately in two apparatus to the staple length. An adjoining distributing mechanism consisting of a plurality of grooved rollers with smooth pressure rollers distributes the material. By means of pairs of draw off rollers the fibrous material is deposited on to a conveyor band and united. By means of a rotary hopper it is consolidated and rounded and made into an extensible fiber band or ribbon.

The invention relates primarily to an apparatus for the continuous cutting up of a dry endless hank or skein of artificial fibers, and also a distribution of the cut staple material at the same time maintaining the parallelism of the fibers. The apparatus can be arranged for the fibers to move in a vertical, horizontal hank or skein to move in a vertical, horizontal or oblique direction. The cutting device is so arranged, that it can be set to the desired length of staple and also the direction of cutting can be either at right angles to the path of motion or oblique thereto. In the cutting, the fibrous material to be cut is very particularly preserved; it runs continuously through two pairs of feeding in rollers arranged one below the other. According to the desired length of staple a circular disc knife operates between the feeding in rollers and cuts through the tensioned hank or skein of artificial fiber as it runs in. The knife alternately cuts the one and the other hank, and for this purpose the knife moves periodically from one hank to the other. At the line of cutting of the artificial fiber hank or skein the ends of the fibers attain a brush like appearance, which is very important for the subsequent treatment of the distributed fibers; the band or ribbon runs even now somewhat more broadly into the first grooved roller, so that this roller can grasp it better and bring about more rapidly a uniform distribution. The cut staple fiber material, consisting of 20 to 30 thousand individual fibers, is distributed into the distributing mechanism, which operates continuously. This distribution mechanism has the purpose of distributing the cut quantity of fiber in two directions, namely in breadth and length. In this distribution each individual fiber is worked and acquires an undulating appearance. By means of the external alteration of the individual fibers and their new distribution the fibrous material acquires a bloom or naplike appearance as it leaves the distribution mechanism.

The distribution mechanism consists of a plurality of grooved rollers with smoothed pressure rollers, which are arranged perpendicularly beneath one another. Each pair of rollers runs with a definite lead relatively to the one above it. The fibrous material runs into the first grooved roller and only the fibers which ran in the grooves of the first grooved roller are grasped by the second grooved roller. In the further grooved rollers the grooves are always staggered relatively to those of the preceding grooved rollers. The definite fibers are thus alternately grasped and brought into their new position. By this operation the fibrous material is distributed threefold in breadth and fourfold in the longitudinal direction. At the outlet the distributed fibrous material is drawn off. As can be seen an extensible fiber band or ribbon is formed by guiding the fibers together into a rotary hopper.

The accompanying drawing shows by way of example one constructional form of the subject of the invention, viz.:

Figures 1 and 2 show the device in front and side elevation.

The hank or skein $a$ of artificial fiber runs into the first pair of feeding in rollers $b$, $c$, which are driven continuously. The second pair $b_1$, $c_1$ of feeding in rollers runs somewhat faster than the first pair of feeding in rollers; by this means the entering hank or skein of artificial fiber is brought somewhat into tension. A rotary disc knife $d$ coming into operation cuts through the hank or skein. The section $a_1$ of staple fiber is grasped by the first pair of a pair of rollers $e_1$, $f_1$ comprising a roller $e_1$ provided with grooves and a smooth pressure roller $f_1$, which has the same speed as the second pair of feeding in rollers. The second and also the third and fourth pair $e_2$, $e_3$, $e_4$, of rollers each runs faster than the preceding pair.

Figures 3, 4 and 5 show in front and side elevation and in plan the arrangement of the rollers. Each pair of rollers comprises a lower roller, $e_1$—$e_4$, provided with grooves, and also a smooth pressure roller, $f_1$—$f_4$. The grooves turned in the roller are arranged over the whole operative width of the rollers. The grooves on the rollers are staggered in successive rollers in the direction in which the material runs. By means of a pair of draw off rollers $g$, $h$, the band or ribbon of fiber is deposited on a conveyor band $i$. This unites the distributed bands of fibers from a plurality of devices and the resultant band is consolidated and rounded by means of a pair $k$ of rollers and by means of a rotary hopper $l$. A pair of delivery rollers $m$ releases the band or ribbon, which is received in pots or coilers or formed into laps or rolls.

Having now particularly described and ascertained the nature of my said invention and in what manner the same is to be performed, I declare that what I claim is:

1. A method of making extensible bands or ribbons of staple fiber which consists in feeding two artificial fiber hanks in spaced parallel relation, alternately exerting a cutting action on the spaced hanks to cut the hanks into staple lengths, then exerting a drawing and rolling action on the cut staples, and finally uniting the cut staples in such manner that the cut staples of one hank are united with the cut staples of the other hank in overlapping relation.

2. Apparatus of the character described comprising separate guiding means for two endless artificial fiber hanks including pairs of feeding-in rollers, cutting means arranged behind the feeding-in rollers and between the hanks for alternately cutting through the fiber hanks to divide the latter into staple lengths, a plurality of pairs of rollers arranged behind the cutting means, each pair consisting of one grooved roller and one smooth pressure roller, the grooves in the grooved roller of one pair being staggered with relation to the grooves in the adjacent pair, conveyor bands receiving the divided fiber lengths arranged to guide the cut fibers together in overlapping relation, and a rotary hopper for receiving the fibers from the conveyor bands to form an extensible fiber band or ribbon.

3. Apparatus as claimed in claim 2, in which the feeding-in rollers are arranged in spaced pairs while the cutting means is arranged between the spaced pairs of feeding-in rollers, and means for operating the pairs of feeding-in rollers behind the cutting means at an increased speed so as to properly tension the fiber hanks during the cutting operation.

JOHANNES SVOBODA.